United States Patent [19]

Neyer

[11] 4,073,306
[45] Feb. 14, 1978

[54] STEAM TRAP

[75] Inventor: Robert D. Neyer, Oreland, Pa.

[73] Assignee: Yarway Corporation, Blue Bell, Pa.

[21] Appl. No.: 762,846

[22] Filed: Jan. 27, 1977

[51] Int. Cl.² .............................................. F16T 1/02
[52] U.S. Cl. ...................................... 137/183; 236/59
[58] Field of Search ............................ 137/183; 236/59

[56] References Cited

U.S. PATENT DOCUMENTS

| 2,051,732 | 8/1936 | McKee | 137/183 X |
| 2,127,649 | 8/1938 | McKee | 137/183 X |
| 3,150,677 | 9/1964 | Bochkoros | 137/183 |
| 3,347,258 | 10/1967 | Judsen | 137/183 |

Primary Examiner—Alan Cohan
Attorney, Agent, or Firm—John W. Logan, Jr.

[57] ABSTRACT

A steam trap in accordance with the preferred embodiment of the invention disclosed herein includes a valve body member formed with inlet and discharge passages and having a valve seat intermediate the passages that cooperates with a valve member to control the flow of fluid. The valve member is movable in a control chamber and is spaced from the control chamber to form an orifice through which fluid can flow from the inlet side of the valve member into the control chamber for controlling the operation of the valve. In accordance with one aspect of the invention, the valve member is made of a material having a different coefficient of thermal expansion than the material forming the control chamber so that the orifice size and the pressure drop thereacross vary non-linearily with temperature whereby the opening and closing of the trap can approximate the saturation curve of the fluid. In accordance with another aspect of the invention, the valve seat is formed in an insert member formed with a plurality of symmetrically arranged inlet and discharge passageways so that inlet flow through the trap is first separated, then combined and so that discharge flow is also separated and combined whereby corrosion of the valve body member is minimized.

19 Claims, 5 Drawing Figures

STEAM TRAP

This invention relates to steam traps and, more particularly, to steam traps that operate, that is, open and close, along a curve closely following the steam saturation curve and that are constructed and arranged to minimize corrosion.

For the efficient operation of a steam trap, that is, apparatus that allows the discharge of condensate and gases from a steam line while preventing the escape of live steam, it is desirable to have the trap operate, that is open and close, as close to the steam saturation temperature as possible. Usually the trap should operate within about 4° F to 5° F of the steam saturation temperature so that the maximum amount of condensate and gases are discharged while steam is not. In traps of the type controlled by a pressure differential across an orifice causing hot condensate to flash to steam it is difficult to maintain the desired differential between the saturation temperature and operating temperature of the trap. The difficulty results from the fact that the orifice size and thus the pressure drop thereacross vary with temperature in a linear manner, but steam saturation temperature and pressure and thus the steam saturation curve varies in a non-linear manner.

To compensate for the non-linear relationship of temperature and pressure along the steam saturation curve and the linear relationship of the pressure differential across the orifice, resort has been made to relatively complicated and expensive adjusting devices. For example, one type of steam trap currently utilized includes a valve body member having inlet and discharge passages and also a valve seat intermediate the passages which cooperates with a valve member for regulating the flow across the valve seat. The valve member is formed with a position movably carried in a control chamber and which has a smaller diameter than the adjacent wall of the control chamber to provide a first orifice through which some of the fluid flows into the control chamber. Also formed in the valve member is a second orifice communicating between the control chamber and the discharge passage through which the fluid in the control chamber can flow to the discharge passage. With the condensate at low temperatures present in the trap, sufficient force is exerted on the piston to keep the valve open. With very hot condensate approaching the steam saturation temperature present it experiences pressure drops across the orifices so that it flashes into steam choking the flow through the control chamber. With the fluid in the control chamber choked, the pressure in the control chamber increases exerting a force on the piston causing the valve member to bear on the valve seat and prevent the flow of fluid. In order to compensate for steam at different saturation points, the remainder of the control chamber is in the form of a generally cylindrical insert having tapered side walls adjacent the piston and carried on a threaded adjusting stem that cooperates with an adjusting nut to vary the position of the tapered walls relative to the piston. By adjusting the position of the insert relative to the piston, the size of the orifice can be adjusted to vary the pressure drop of the fluid flowing through the control chamber. Accordingly, the temperature at which the flashing occurs can be regulated to follow the steam saturation curve.

While the apparatus described above operates in a generally satisfactory manner, it is relatively expensive because the provision of the insert member, threaded stem and threaded adjusting nut is relatively expensive. In addition the most efficient operation of the trap is not assured. When the trap is installed on a steam line, the proper adjustment may not be made causing the efficiency of the trap to suffer. Further, if the saturation point of the steam in the fluid line with which the trap is associated varied, it is possible that no corrective adjustment to the trap will be made. Again, the efficiency of the trap suffers.

Another feature of conventional steam traps adding to their expense relates to the fact that the flow of fluid to and from the valve formed by the valve member and valve seat is through a single flow path which could cause excessive erosion and corrosion of adjacent parts of the trap. In addition, either the inlet or discharge flow is generally perpendicular to parts of the valve body member and adds to the erosion and corrosion problems just noted. To minimize the erosion and corrosion problems, various parts of the conventional steam traps have been formed of stainless steel which, of course, adds to their cost.

Accordingly, it is an object of this invention to provide a steam trap that automatically opens and closes along curves approximately following the steam saturation curve.

It is another object of this invention to provide a steam trap that automatically operates along curves approximately following the steam saturation curve and which modulates flow through the trap.

It is yet another object of this invention to provide a steam trap constructed and arranged to minimize erosion and corrosion of the various parts of the trap.

Finally, it is another object of this invention to provide a steam trap that is reliable and efficient in operation and that is economical to make.

These and other objects of this invention are accomplished by providing a steam trap including a valve body member formed with an inlet passage and a discharge passage and having a valve seat between the inlet and discharge passages that cooperates with a valve member to control the flow of fluid through the trap. The valve member is movable in a control chamber during its operation and is spaced from the control chamber to provide a first orifice through which some of the fluid from the inlet opening can flow into the control chamber to control the movement of the valve member and thus the operation of the valve. In accordance with one feature of this invention, the coefficient of thermal expansion of the material from which the valve member is formed is different than the coefficient of thermal expansion of the material from which the control chamber is formed whereby the size of the orifice and the pressure differential thereacross vary in a non-linear manner to closely approximate the steam saturation curve. Preferably, the coefficient of the thermal expansion of the valve member is larger than the coefficient of thermal expansion of the control chamber.

In accordance with another aspect of this invention, the valve seat is formed in an insert member carried between the inlet and discharge passages. The insert member is formed with a plurality of symmetrically arranged inlet passageways communicating between the inlet passage and the inlet side of the valve seat so that fluid flow is split and then combined before discharge across the valve seat. The insert member is also formed with a plurality of symmetrically arranged discharge passageways communicating between the discharge side of the valve seat and the discharge passage so that fluid flow is split and then combined before the discharge passage. Preferably, all of the passageways extend at an acute angle to the longitudinal axis of the insert member.

For a better understanding of the invention, reference is made to the following description of several preferred embodiments thereof taken in conjunction with the figures of the accompanying drawing, in which.

Figure 1:
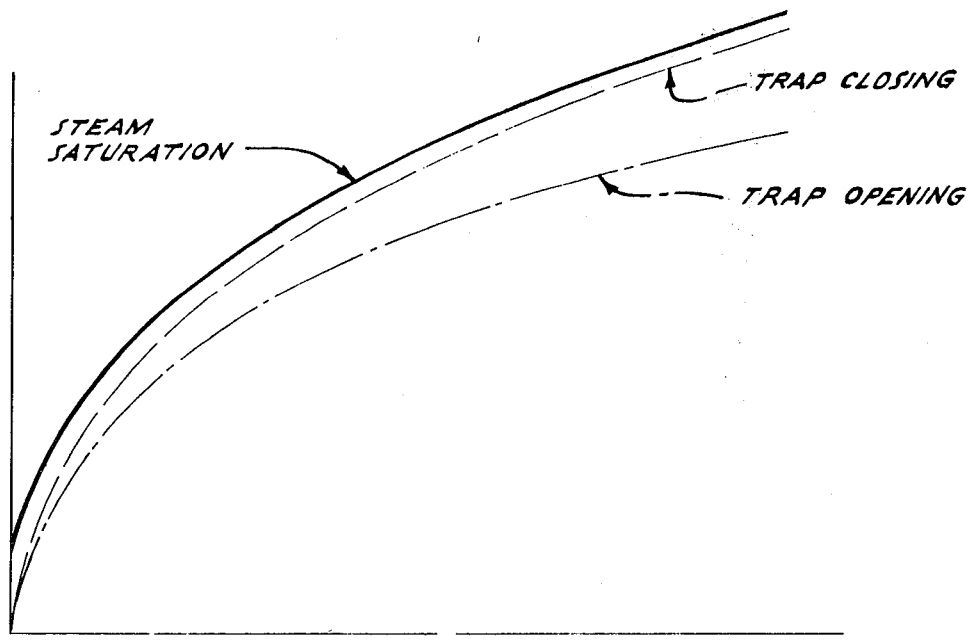
FIG. 1 is a plot illustrating the steam saturation curve and also the operating curves of a steam trap in accordance with this invention.

Referring briefly to FIG. 1 of the drawing, the steam saturation curve is illustrated with the temperature increasing upwardly along the vertical axis and the pressure increasing toward the right along the horizontal axis. The steam saturation curve is well known in the art and need not be specifically described except that the non-linear relationship between temperature and pressure along the curve is noted. For efficiency of operation, it is desirable to have the trap operate, that is, open and close, as close to the saturation temperature as possible so that a maximum amount of condensate is discharged while no steam is discharged. Preferably, it is desirable to have the trap close at about 40° F below the saturation temperature of the steam as illustrated by the trap closing curve immediately below and closely approximating the steam saturation curve. The trap closing curve illustrates the relationship between the temperature and pressure of the condensate used to control the closing of the trap as will be made clear hereinafter. It is noted that while the temperature differential between the two curves is substantially constant throughout, the pressure differential is not, but increases with temperature and pressure along the curve. Also shown in FIG. 1 is the trap opening curve illustrating the temperature at which the trap opens.

Figure 2:
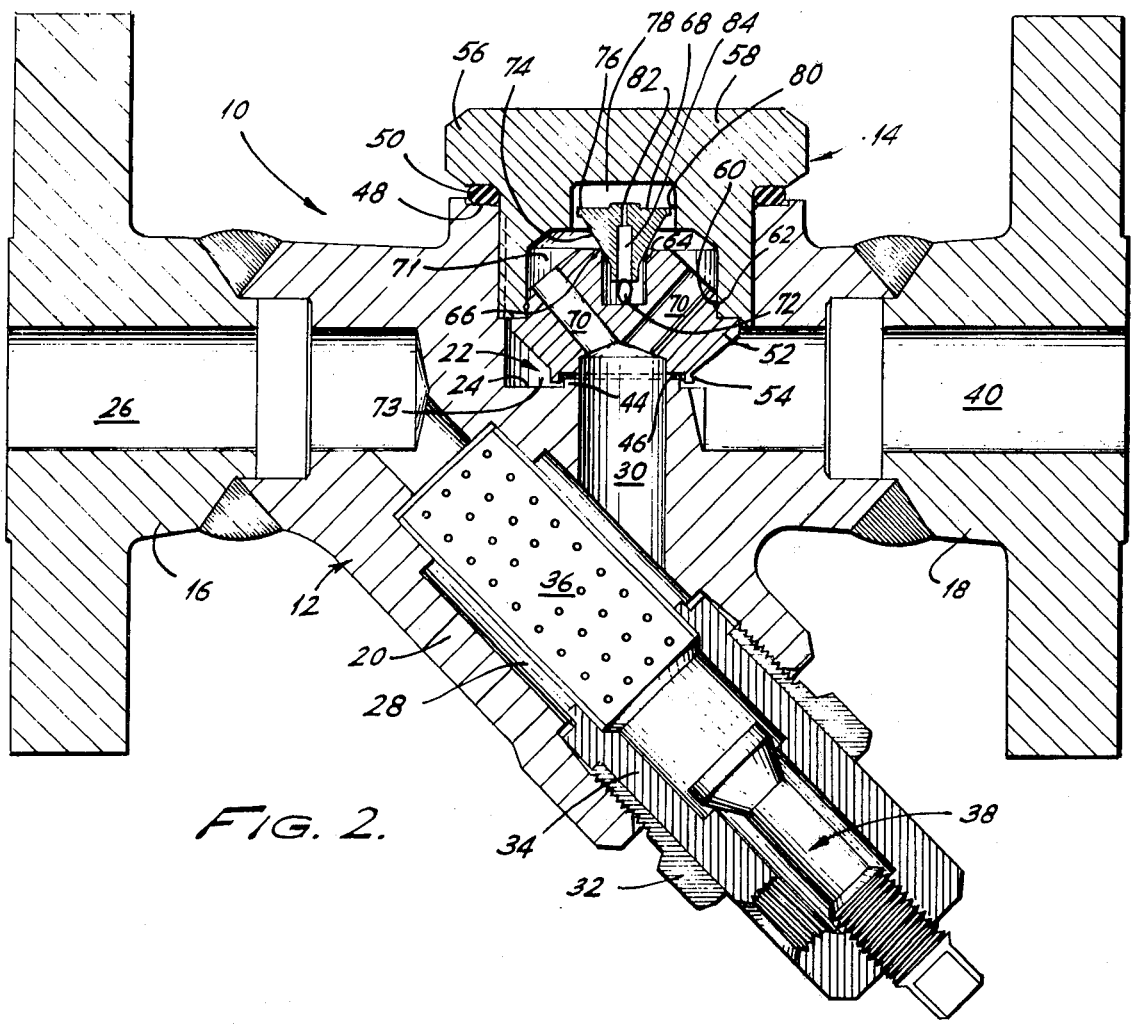
FIG. 2 is a longitudinal section view through a steam trap in connection with a first embodiment of this invention.

Referring now to FIG. 2 of the drawing, there is illustrated a steam trap 10 in accordance with this invention including a body member 12 and a valve insert assembly 14 for controlling flow through the body member. In the embodiment of the invention disclosed here, the body member 12 is of the Y-type and, accordingly, includes an inlet portion 16, a discharge portion 18, and a leg portion 20 extending at an angle to the inlet and outlet portions. Intermediate the inlet and discharge portions, the body member is formed with a generally cylindrical recess 22 extending inwardly from an outer surface thereof and terminating at an annular end face 24 located internally of the body member. A portion of the cylindrical wall forming the recess 22 is formed with a thread configuration for receiving and securing the insert assembly 14 to the body member 12 as will be explained hereinafter.

An inlet passage is formed in the body member 12 and includes a first passageway 26 formed in the inlet portion 16, a second passageway 28 formed in the leg portion 20 and a third passageway 30 extending upwardly from the second passageway at a generally right angle to the first passageway and which terminates in the end face 24. In use the passageway 26 communicates with a steam line so that fluid in the line flows into the trap 10. The passageway 28 is formed with an internally threaded portion adjacent its free end which cooperates with an externally threaded portion of a bushing 32 which clamps a sleeve member 34 in position as illustrated. The sleeve member 34 in turn clamps a strainer 36 in position in the second passageway 28. The strainer 36 is a perforated cylindrical member arranged so that incoming fluid from the passageway 26 flows through its interior, then through the perforations to the passageways 28 and 30. The sleeve member 34 carries a blowdown valve member 38 that cooperates with an interior shoulder in the sleeve member. As is usual in the art, the blowdown valve member 38 can be opened for bleeding the trap and the bushing 32 and sleeve member 34 can be removed for periodic cleaning of the strainer 36. Use of the integral strainer and blowdown valve arrangement are generally conventional and are not necessary for the practice of this invention. It should thus be understood that the leg 20 and passageway 28 could be eliminated and that passageway 26 could communicate directly with passageway 30.

Also formed in the body member 12 is a discharge passage which is in the form of a passageway 40 located in the discharge portion 18 and that communicates with the recess 22 through the end face 24 and sidewall thereof. In use the passageway 40 communicates with a suitable collector system to which fluid from the trap flows.

The end face 24 of the recess 22 is formed with an annular rib member 44 having a surface which extends about the passageway 30. On the surface of the rib member 44 is seated a sealing ring 46 clamped in place by a bearing surface formed on the insert assembly 14. The outer surface of the body member is formed with a seat 48 in the form of an annular recess extending around the cylindrical recess 22. A sealing ring 50 is located in the seat 48 and is clamped in place by another bearing surface formed on the valve insert assembly 14.

The valve insert assembly 14 includes a valve insert member 52 formed with a recess at one end which forms the bearing surface clamping the sealing ring 46 in place and is also formed with a depending skirt 54 surrounding the sealing member 46 and the side walls of the rib member 44. The valve insert member 52 is retained with the body member 12 by a bonnet 56 including a cylindrical portion formed with a thread configuration that cooperates with the thread configuration formed in the recess 22. A bearing surface on the free end of the cylindrical portion of the bonnet 56 bears on a flange formed on the valve insert member 52. At the upper end of the cylindrical portion of the bonnet 56 is formed a radially projecting flange 58 providing the bearing surface that clamps the sealing ring 50 in its seat 48 and which is also formed with a wrenching configuration around its periphery to accomodate a tool used to assemble or disassemble the insert assembly 14 with the body member 12. Further facilitating the assembly and disassembly of the insert assembly 14 in the body member 12, the insert member 52 includes a cylindrical portion snugly received in the cylindrical portion of the bonnet 56 and the cylindrical portions are formed wth adjacent grooves 60, 60 in which a compressible retaining ring 62 is located. The retaining ring 62 normally retains the insert member 52 and bonnet 56 in assembled relationship during assembly and disassembly of the trap. Axial force applied to the assembly will be sufficient to compress the retaining ring 62 and allow the bonnet 56 and valve insert member 52 to slide relative to one another to permit their disassembly.

Figure 3:
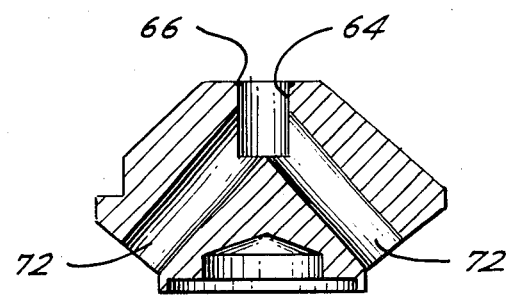
FIG. 3 is a longitudinal section view through the insert member illustrated in FIG. 2 of the drawing with the section line rotated 90°.

Completing the description of this embodiment of the invention, the valve insert member 52 further includes a central passage 64 having a valve seat 66 at one end that cooperates with a valve member 68 for controlling the flow of fluid from the inlet to the discharge passages. The insert member 52 is further formed with a pair of symmetrically arranged inlet passageways 70, 70 communicating between the passageway 30 and an annular chamber 71 formed between the insert member and the bonnet 56. As seen in FIG. 3 of the drawing, the insert member 52 is also formed with a pair of symmetrically arranged passageways 72, 72 communicating between the passage 64 and an annular chamber 73 formed between the insert member and the lowermost portion of the recess 22. The annular chamber 71 communicates with the passage 64 and the annular chamber 73 communicates with the passageway 40.

The valve member 68 is formed with an inclined surface 74, the smallest diameter of which extends into the passage when the valve is closed, that is when the inclined surface bears on the valve seat 66. As the valve opens, that is as the inclined surface 74 moves upwardly, as seen in the drawing, away from the seat, the size of the flow orifice increases and the flow rate through the valve is increased. Thus, the flow of the condensate is modulated. As seen in the drawing a cylindrical extension is formed adjacent the smallest diameter of the inclined surface so that a fully open position of the valve is provided. In addition, the cylindrical extension functions to center the valve member 68 in the passage 64. Adjacent the largest diameter of the inclined surface is formed a piston 76 slidably received in a recess formed in the bonnet 56 to provide control chamber 78. The diameter of the piston 76 is slightly less than the diameter of the adjacent sidewall of the control chamber 78 forming an orifice 80 through which some of the fluid flowing to the trap can flow into the control chamber. Concentrically formed in the valve member 68 are a second orifice 82 and a passage 84 that communicate between the control chamber 78 and the passage 64 formed in the insert member 52. The area of the second orifice 82 is less than the area of the first orifice and at normal temperature the first orifice 80 is preferably about twice the area of the second orifice.

The valve member 68 is formed of a different material than the bonnet 56 and, more particularly, than the material in which the recess forming the control chamber 78 is formed. One of the materials, preferably that forming the valve member 68, is formed of a material having a higher coefficient of thermal expansion than the other material, again preferably that forming the control chamber 78. More particularly the larger coefficient of thermal expansion is about twice that of the smaller. Thus, the size of the first orifice 80 will vary non-linearly with temperature and the size of the second orifice 82 will vary linearly with temperature.

When the steam system with which the trap 10 is associated is started, the valve is closed with the inclined surface 74 of the valve member 68 bearing on the valve seat 66. Fluid in the form of condensate and gases flow through the inlet passage, that is, through the passageway 26 to the strainer 36 and through the perforations to the passageways 28 and 30. From the passageway 30 the fluid splits and flows through the passageways 70, 70 to the annular chamber 71 where it exerts pressure on the inclined surface 74 and the bottom surface of the piston 76 and lifts the valve member upwardly in the control chamber 78 so that the inclined surface does not bear on the valve seat 66. The valve is now, of course, open and the condensate and gases flow through the passageway, split and flow through the passageways 72, 72 to the annular chamber 73 and through the dishcarge passage 40. Concurrent with this flow, some of the condensate and gases flow through the first orifice 80 into the control chamber 78 experiencing a pressure drop and then through the second orifice 82 in the passage 84 experiencing an additional pressure drop. From the passage 84 the fluid from the control chamber is discharged through the passageways 64 and 72, 72 to the annular chamber 73 and through the discharge passage 40. The pressure drop across the first orifice 80 is such that the pressure exerted on the top surface of the piston 80 is not sufficient to close the valve. Because of the inclined surface 74 and the relative sizes of the first and second orifices noted above the orifice across the valve varies in size so that the internal flow is modulated until the cylindrical extension adjacent the smallest diameter of the inclined surface is adjacent the valve seat at which time maximum flow occurs.

As the temperature of the condensate and gases approaches the steam temperature, the pressure differential is such that the condensate discharged through the second orifice 82 is sufficiently hot to flash to steam at the pressure at the discharge side of the second orifice. When the condensate flashes to steam it expands significantly choking the flow of condensate from the control chamber 78 through the second orifice 82 and causes a pressure increase in the control chamber which offsets the pressure acting on the inlet side of the valve member 68. At this point the valve member 68 moves toward the valve seat 66 until the inclined surface 74 bears on the valve seat 66 closing the valve. As long as the temperature of the condensate is high enough to allow the condensate to flash to steam, the valve remains closed; if, however, the temperature of the condensate drops the flashing is discontinued and the pressure in the control chamber 78 is relieved allowing the pressure on the inlet side of the valve member to lift the inclined surface 74 off of the valve seat 66. Condensate now flows through the trap 10 as described above until the condensate again flashes to steam as also described.

It is noted that the above operation of the trap 10 is preferred, but that, if desired, the relative sizes of the first orifice 80 and the second orifice 82 could be such that the flashing of steam at the discharge side of the second orifice will not choke the flow therethrough to cause a sufficient pressure increase in the control chamber to close the valve. With this arrangement, condensate flow continues until its temperature is sufficiently high to flash to steam at the pressure in the control chamber 78. At this point the steam will cause the valve to close.

It should now be realized that by selecting the proper orifice sizes, the pressure drops can be controlled so that the temperature at which the condensate flashes can also be controlled. If the orifice sizes vary in a controlled manner the temperature at which the condensate flashes to steam can also be controlled and the trap can close along the curve illustrated in FIG. 1 of the drawing. That is, the differential between the saturation temperature and trap operation temperature can be maintained substantially constant regardless of the steam saturation point. The manner of varying the orifice sizes in accordance with this invention will now be explained.

As the temperature of the condensate and gases fluctuates, it should be realized that the material forming the recessed part of the control chamber 78 and the material forming the valve member 68 expand with an increase in temperature and contract with a decrease in temperature. Because of the different coefficients of thermal expansion, the size of the orifice 80 decreases non-linearly as the temperature increases and increases non-linearly as the temperature decreases. Accordingly, the pressure differential across the orifice 80 increases non-linearly as the temperature increases and decreases non-linearly as the temperature decreases. The size of the orifice 82 decreases linearly as the temperature increases and increases linearly as the temperature decreases. Accordingly, the pressure drop across the orifice 82 increases linearly as the temperature increases and decreases linearly as the temperature decreases. It should be realized that the pressure drop in the flow through the control chamber increases non-linearly as the temperature increases and decreases non-linearly as the temperature decreases. By selecting materials with appropriate coefficients of thermal expansion, the pressure differential and thus, the pressure on the discharge side of the orifice 82 can be made to vary so that the flashing temperature and, thus the closing temperature of the trap is substantially a predetermined constant less than the saturation temperature. Accordingly, any variation in the saturation point of steam in the system will automatically be compensated for in the closing of the trap so that the closing curve closely approximates the saturation curve. It should also be understood that as the size of the orifice 80 increases non-linearly as the cooler condensate reaches the trap, the pressure differential across the orifice decreases non-linearly so that the trap opens at a higher temperature than usual. As noted the fluid flow splits as it flows through the insert member because of the use of a plurality of inlet passageways 70,70 and discharge passageways 72,72. Because the flow is split it is not concentrated at a single adjacent point of the bonnet and valve body member so that erosion and corrosion problems are reduced. In addition, because of the acute angle of the passageways 70,70, 72,72 with respect to the annular chambers 71 and 73, the erosion and corrosion of the adjacent portions of the bonnet and valve body member are further reduced. Thus the valve body member 12 can be made of relatively inexpensive carbon steel. Preferably, the insert member 52 is made of stainless steel.

Figure 4:
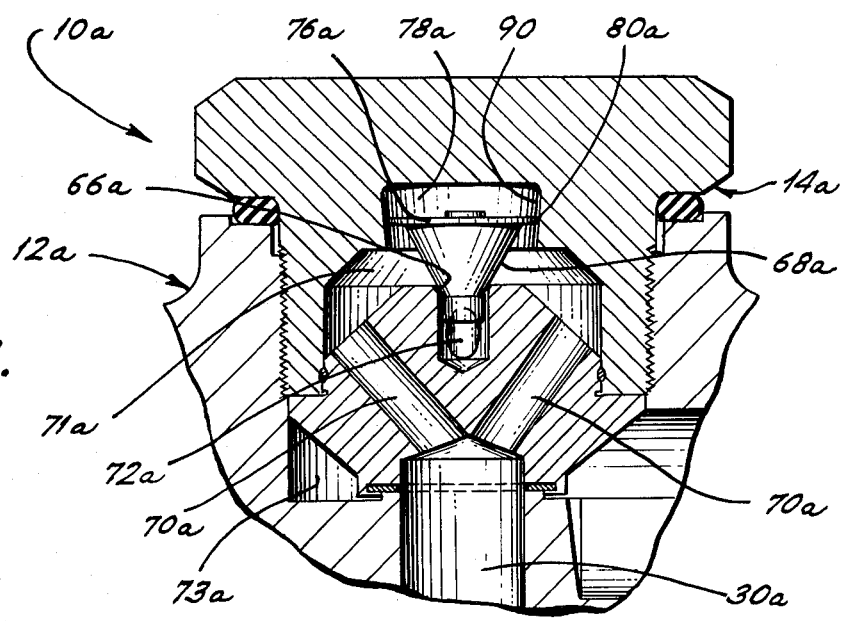
FIG. 4 is a longitudinal view of a portion of a steam trap in accordance with a second embodiment of this invention; and, FIG. 5 is a longitudinal section view of a portion of a steam trap in connection with a third embodiment of this invention.

Referring to FIG. 4 of the drawing, a valve insert assembly 14a in accordance with another embodiment of the invention is illustrated wherein flow modulation of condensate through the trap is provided in a different manner. A trap 10a in accordance with FIG. 4 is generally the same as the trap 10 illustrated in FIG. 2 and thus, the same description applies and the same reference numerals will be utilized with the suffix a. It is noted that in this embodiment of the invention, the recess forming the control chamber 78a is formed with tapered side walls indicated by reference numeral 90, the taper being on the order of about 0.007 of an inch per inch of length so that the size of the orifice 80a varies as the valve member 68a rides up and down in the control chamber. The size of the orifice 80a increases as the valve member moves away from the valve seat 66a and decreases as the valve member moves toward the valve seat. The steam trap in accordance with this embodiment of the invention operates as above described except that when the condensate is flowing, the variation in the size of the orifice 80a provided by the taper varies the pressure drop of the fluid across the first orifice. The pressure drop decreases as the valve is opening and increases as the valve is closing. Thus, the flow of condensate is modulated.

Figure 5:
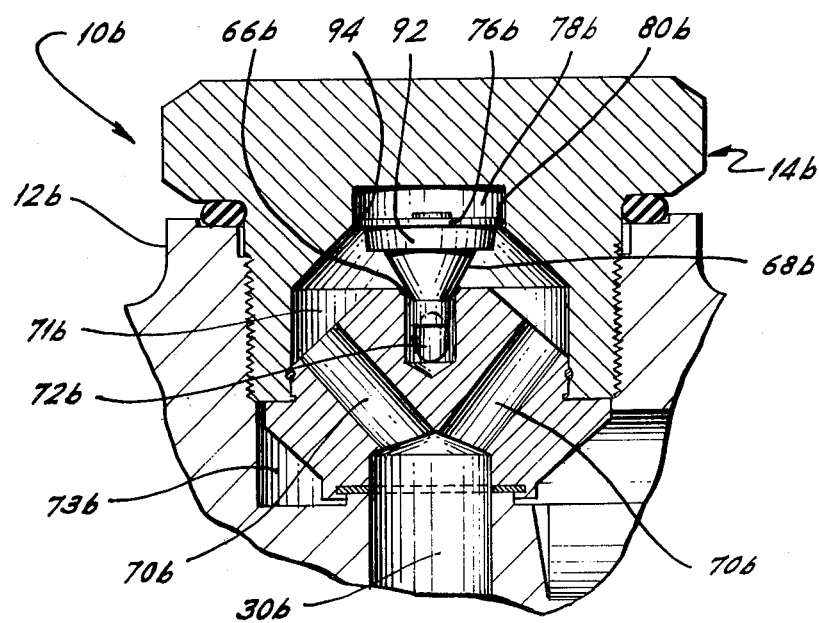

Referring to FIG. 5 of the drawing, a valve insert assembly 14b in accordance with still another embodiment of the invention is illustrated wherein flow modulation of condensate through the trap is provided in still another manner. A trap in accordance with FIG. 4 is generally the same as the trap 10 illustrated in FIG. 2 and thus the same disclosure applies and the same reference numerals will be utilized with the suffix b. In this embodiment of the invention, the valve member 68b is formed with a tapered surface 92 below, as viewed in the drawing, the piston 76b, the taper again being on the order of about 0.007 of an inch per inch of length. The lower end of the recess forming the control chamber 78b is formed with a circular lip 94 that cooperates with the tapered surface 92 to provide a variable orifice upstream of the orifice 80b. The size of the variable orifice between the tapered surface 92 and the lip 94 increases as the valve member 68b moves away from the valve seat 66b and decreases as the valve member moves toward the valve seat. Again, the pressure drop decreases as the valve is opening and increases as the valve is closing so that the flow of condensate is modulated.

From the foregoing description of several preferred embodiments of the invention, it can be realized that by utilizing the materials of different coefficients of thermal expansion to form the orifice the size of the orifice varies non-linearly and thus the pressure drop can be made to vary non-linearly with temperature. By selecting the correct coefficient of thermal expansion, the pressure differential can be made to follow the closing curve illustrated in FIG. 1 of the drawing such that the temperature differential between the steam saturation curve and the opening point of the trap can be maintained substantially constant. Other advantages of the invention, that is, the flow modulation and the easy relacement of the insert assembly, can also be appreciated as well as the minimizing of erosion and corrosion problems.

While in the foregoing, there has been disclosed preferred embodiments of the invention, it should be obvious to those skilled in the art that various modifications and changes can be made without departing from the true spirit of the invention as recited in the appended claims.

I claim:
1. A steam trap comprising a body including an inlet opening, a discharge opening and a valve seat formed between said inlet and discharge openings, a valve member cooperating with said valve seat to control flow from said inlet opening to said discharge opening, said valve member being movable in a control chamber and being spaced therefrom to form a first orifice through which fluid can flow to said control chamber, said valve member being formed from a material having a coefficient of thermal expansion different from the material forming said control chamber whereby the size of said orifice and the pressure differential thereacross vary non-linearily with temperature.

2. A steam trap in accordance with claim 1 wherein said coefficient of thermal expansion of said valve member is greater than that of said control chamber.

3. A steam trap in accordance with claim 2 wherein said coefficient of thermal expansion of said valve member is about twice that of said control chamber.

4. A steam trap in accordance with claim 1 wherein said valve member includes piston means slidable in said control chamber, said piston means having a smaller diameter than the adjacent wall of said control chamber to form said first orifice, said valve member including a second orifice between said control chamber and said discharge opening.

5. A steam trap in accordance with claim 4 wherein said second orifice is smaller than said first orifice whereby the pressure drop across said second orifice is greater than that across said first orifice.

6. A steam trap in accordance with claim 4 wherein said valve member is provided with an inclined surface for modulating flow across said valve seat.

7. A steam trap in accordance with claim 5 wherein the size of first orifice is about twice the size of said second orifice whereby said flow across said valve seat is modulated.

8. A steam trap in accordance with claim 5 wherein said adjacent wall of said control chamber is tapered whereby said flow across said valve seat is modulated.

9. A steam trap in accordance with claim 5 wherein said valve member is formed with a tapered surface adjacent said piston means whereby said flow across said valve seat is modulated.

10. A steam trap in accordance with claim 1 wherein said valve seat is formed on an insert member located between said inlet and discharge openings, said insert member being formed with a plurality of symmetrically arranged inlet passageways communicating between said inlet opening and the inlet side of said valve seat, said insert member being further formed with a plurality of symmetrically arranged discharge passageways communicating between the discharge side of said valve seat and said discharge opening.

11. A steam trap in accordance with claim 10 wherein all of said passageways extend at an acute angle to the longitudinal axis of said insert member.

12. A steam trap in accordance with claim 10 wherein a first generally annular chamber is formed between said inlet passageways and said valve seat whereby flow from said inlet opening is split through said inlet passageways and combines in said first generally annular chamber before discharging through said valve seat.

13. A steam trap in accordance with claim 12 wherein a second generally annular chamber is formed between said discharge passageways and said discharge opening whereby flow from said valve seat is split through said discharge passageways and combines in said second generally annular chamber before discharging through said discharge opening.

14. A steam trap in accordance with claim 10 wherein an annular chamber is formed between said discharge passageways and said discharge opening whereby flow from said valve seat is split through said discharge passageways and combines in said generally annular chamber before discharging through said discharge opening.

15. A steam trap comprising a body including an inlet opening, a discharge opening and an insert member between said inlet and discharge openings, a valve seat formed in said insert member and a valve member cooperating with said valve seat for controlling the flow of fluid from said inlet opening to said discharge opening, said valve member being responsive to the presence of hot condensate on the inlet side of said valve seat to allow the flow of the condensate from said inlet opening to said discharge opening and being responsive to the presence of steam on the inlet side of said valve seat to prevent the flow of steam from said inlet opening to said discharge opening, said insert member being formed with a plurality of symmetrically arranged inlet passageways communicating between said inlet opening and the inlet side of said valve seat, said insert member being further formed with a plurality of symmetrically arranged discharge passageways communicating between the discharge side of said valve seat and said discharge opening.

16. A steam trap in accordance with claim 15 wherein all of said passageways extend at an acute angle to the longitudinal axis of said insert member.

17. A steam trap in accordance with claim 15 wherein a first generally annular chamber is formed between said inlet passageways and said valve seat whereby flow from said inlet opening is split through said inlet passageways and combines in said first generally annular chamber before discharging through said valve seat.

18. A steam trap in accordance with claim 17 wherein a second generally annular chamber is formed between said discharge passageways and said discharge opening whereby flow from said valve seat is split through said discharge passageways and combines in said second generally annular chamber before discharging through said discharge opening.

19. A steam trap in accordance with claim 15 wherein an annular chamber is formed between said discharge passageways and said discharge opening whereby flow from said valve seat is split through said discharge passageways and combines in said generally annular chamber before discharging through said discharge opening.

* * * * *

UNITED STATES PATENT AND TRADEMARK OFFICE
CERTIFICATE OF CORRECTION

PATENT NO. : 4,073,306

DATED : February 14, 1978

INVENTOR(S) : ROBERT D. NEYER

It is certified that error appears in the above-identified patent and that said Letters Patent are hereby corrected as shown below:

Column 3, line 36, "40° F" should be --4° F--.

Signed and Sealed this

Twenty-third Day of May 1978

[SEAL]

Attest:

RUTH C. MASON
Attesting Officer

LUTRELLE F. PARKER
Acting Commissioner of Patents and Trademarks